(12) United States Patent
Borawski et al.

(10) Patent No.: US 11,616,999 B1
(45) Date of Patent: Mar. 28, 2023

(54) METHODS AND APPARATUS TO AUTOMATE THE RECORDING OF MEDIA FOR SIGNATURE CREATION

(71) Applicant: The Nielsen Company (US), LLC, New York, NY (US)

(72) Inventors: Albert T. Borawski, Oldsmar, FL (US); Shailendra Paranjape, Tampa, FL (US); Nigel Smith, McKinney, TX (US); Eric M. Rosell, New York, NY (US); John Ferrell, Lynchburg, VA (US); Jessica Salazar, New York, NY (US); Morgan Nibert, Tampa, FL (US); David Christie, New York, NY (US)

(73) Assignee: The Nielsen Company (US), LLC

( * ) Notice: Subject to any disclaimer, the term of this patent is extended or adjusted under 35 U.S.C. 154(b) by 0 days.

(21) Appl. No.: 17/491,187

(22) Filed: Sep. 30, 2021

(51) Int. Cl.
*H04N 21/258* (2011.01)
*H04N 21/84* (2011.01)

(52) U.S. Cl.
CPC ....... *H04N 21/25866* (2013.01); *H04N 21/84* (2013.01)

(58) Field of Classification Search
CPC .................. H04N 21/25866; H04N 21/84

USPC ............................................................. 725/9
See application file for complete search history.

(56) References Cited

U.S. PATENT DOCUMENTS

| | | | |
|---|---|---|---|
| 10,579,668 B1* | 3/2020 | Ramanathan | G06F 16/2255 |
| 11,461,393 B1* | 10/2022 | Jain | H04N 21/858 |
| 2021/0144443 A1* | 5/2021 | Joh | H04N 21/84 |
| 2022/0141504 A1* | 5/2022 | Grover | H04N 21/84 |
| | | | 725/36 |
| 2022/0256209 A1* | 8/2022 | Vartakavi | G11B 27/322 |

\* cited by examiner

*Primary Examiner* — Dominic D Saltarelli
(74) *Attorney, Agent, or Firm* — Hanley, Flight & Zimmerman, LLC

(57) ABSTRACT

Methods, apparatus, systems, and articles of manufacture are disclosed to automate the recording of media for signature creation. Reference signature requests are received from an employee or user. The reference signature request is distributed to automated capture tool circuitry, which plays the relevant media for a meter and provides a status update. When a signature is created, a status update indicates whether it is considered to be a reference signature. Prioritization circuitry assigns and updates a priority for each of the requests according to the priority of other requests, the status updates, and a priority rule set. Reference signature requests with the highest priority are assigned to automated capture tool circuitry for completion before lower priority requests.

24 Claims, 11 Drawing Sheets

| 502 REQUEST ID | 504 STREAMING SOURCE | 506 MEDIA TITLE | 514 SEASON | 514 EPISODE | 516 MEDIA DURATION | 518 MEDIA PROVIDED BY STREAMING SOURCE? | 520 MEDIA CREATED BY STREAMING SOURCE? | 522 LANGUAGE REQUIRED | 524 CAPTURE INSTRUCTIONS | 526 SCHEDULE CAPTURE DATE |
|---|---|---|---|---|---|---|---|---|---|---|
| 1 | DISNEY +® | BLACK WIDOW® | N/A | N/A | 2:14:00 | NO | YES | EN, FR | PLAY ENTIRE DURATION | 07-09-21 |
| 2 | PRIME VIDEO® | THE TOMORROW WAR® | N/A | N/A | 2:20:00 | NO | YES | EN, SP, FR | SKIP END CREDITS | 07-02-21 |
| 3 | NETFLIX® | THE GOOD PLACE® | 1 | 4 | 0:21:00 | YES | NO | EN, SP, CN, KR | FF TO 00:02:30 | 09-29-16 |

| 502 REQUESTED SIGNATURE TYPE | 529 ACTUAL CAPTURE DATE | 530 STATUS OF SIGNATURE CAPTURE | 532 REASON FOR FAILURE | 534 ADDED TO CANDIDATE SIGNATURE DATABASE? | 538 REASON FOR NOT BEING ADDED | 540 # ATTEMPTS | 542 # SIGNATURES RECORDED | 544 # SIGNATURES NEEDED | 546 PRIORITY |
|---|---|---|---|---|---|---|---|---|---|
| PAS, NDASH | 07-10-21 | FAILURE | MEDIA PLAYER FROZE AT 01:40:15 | NO | SIGNATURE CREATION FAILED | 12 | 7 | 16 | HIGH |
| STREAMFP | 07-08-21 | SUCCESS | N/A | NO | SIGNATURE IS DUPLICATE | 13 | 11 | 12 | LOW |
| UNITAM | 10-04-16 | SUCCESS | N/A | YES | N/A | 17 | 16 | 16 | N/A |

FIG. 5

METHODS AND APPARATUS TO AUTOMATE THE RECORDING OF MEDIA FOR SIGNATURE CREATION

FIELD OF THE DISCLOSURE

This disclosure relates generally to media signatures and, more particularly, to methods and apparatus to automate the recording of media for signature creation.

BACKGROUND

In recent years, the viewing of media has evolved. For example, a viewing session may now involve streaming media over a network to a consumer device. The streaming media comes from a streaming source, such as a platform (e.g., Netflix®) or a streaming live station (e.g., Sling TV®). The streaming source is composed of various pieces of content, which may take the form of, but is not limited to, a movie, show, musical, comedy special, etc. Some media is only available on a single streaming source, where other media is available on multiple streaming sources. Some media is available on a streaming source and available on live television via an antenna or cable box.

BRIEF DESCRIPTION OF THE DRAWINGS

FIG. 5 is an example data set that may be stored in the example asset store circuitry of FIG. 1.

The figures are not to scale. In general, the same reference numbers will be used throughout the drawing(s) and accompanying written description to refer to the same or like parts.

Figure 1:
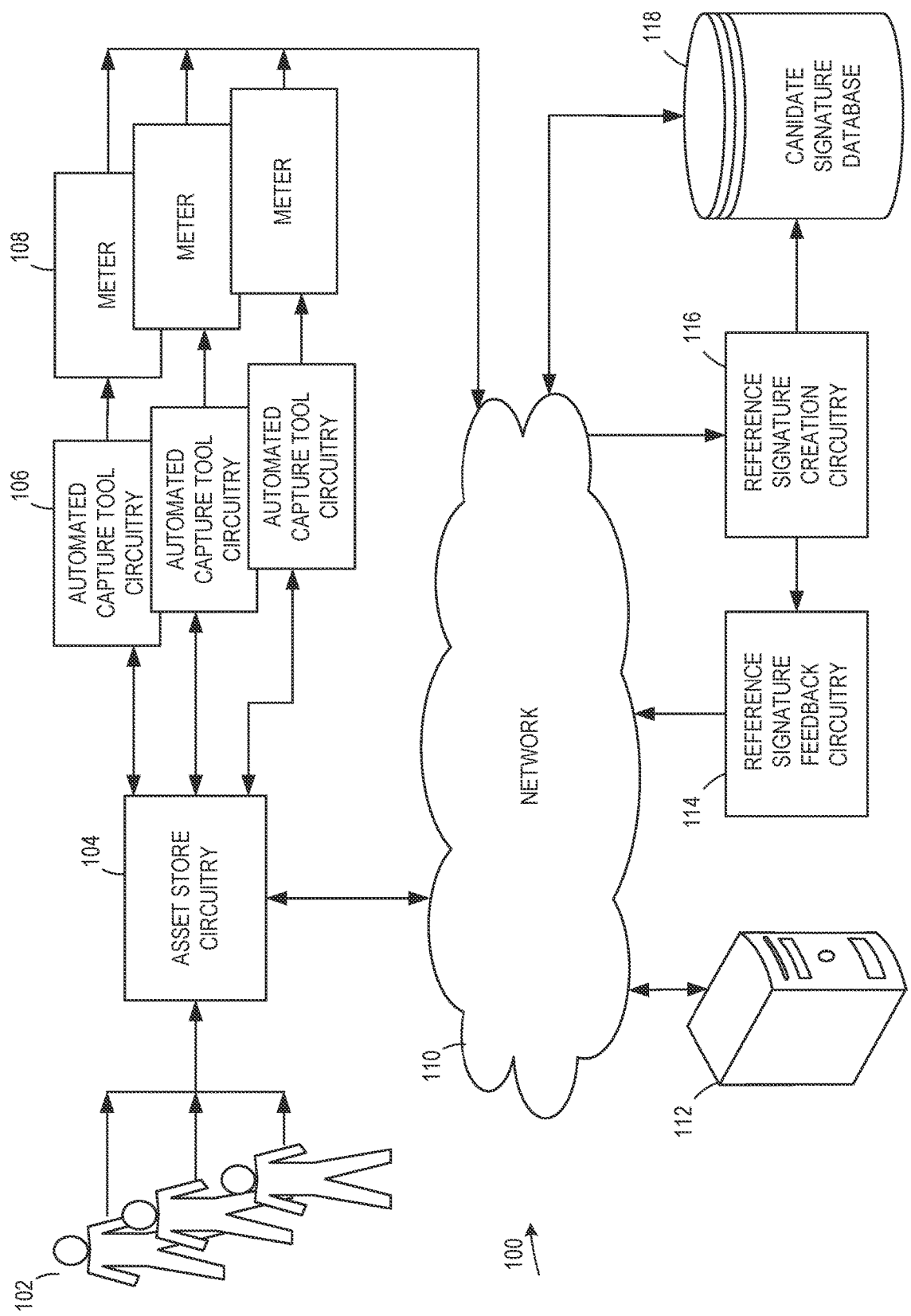
FIG. 1 is a block diagram of an example system to automate the recording of media for signature creation.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially" refers to occurrence in a near instantaneous manner recognizing there may be real world delays for computing time, transmission, etc. Thus, unless otherwise specified, "substantially" refers to +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many entities have an interest in understanding how users are exposed to media on the Internet. For example, an audience measurement entity (AME) desires knowledge of how users interact with media devices, such as smartphones, tablets, laptops, smart televisions, etc., and/or media presented thereon. For example, an AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc., of an audience for media. For example, media (e.g., audio and/or video media) may be distributed by a media distributor to media consumers. Content distributors, advertisers, content producers, etc. have an interest in knowing the size of an audience for media by the media distributor, the extent to which an audience consumes the media, whether the audience pauses, rewinds, fast-forwards the media, etc. In some examples, the term "content" includes programs, advertisements, clips, shows, etc., In some examples, the term "media" includes any type of audio and/or visual content and/or advertisement delivered via any type of distribution medium. Thus, media includes television programming and/or advertisements, radio programming and/or advertisements, movies, web sites, streaming media, etc. Unless context clearly dictates otherwise, for ease of explanation, "media" refers to a piece of media (e.g., movie, TV show, etc.) in its entirety. Further, some AMEs may use the term "asset" to refer to a piece of media. As used herein, the terms "asset" and "media" may be used interchangeably.

In some instances, AMEs identify media by extracting media identifiers such as signatures, or media-identifying metadata, such as codes, watermarks, etc., and comparing them to reference media identifiers. For example, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A reference signature may be a series of constituent signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature.

AMEs have an interest in creating reference signatures for media in a timely fashion. When media is made available on a streaming source, AMEs may create signatures of the media to supplement the signatures of the media generated by panelists. This is done to increase the total number of signatures available for that media, which in turn decreases the time needed to create the desired reference signatures. Currently, the creation of a signature by an AME involves an employee selecting the media from a list, navigating to a streaming source which hosts the media, and playing the media so that an attached meter can generate a signature. This approach has problems in scaling and efficiency due to the coordination required to determine which media from the list should be played first, how many times each media should be played, where the resulting signatures should be saved, etc. By automating the process of recording media for signature creation, AMEs can employ the disclosed system to generate a greater number of signatures at a higher efficiency.

FIG. 1 is a block diagram of an example system to automate the recording of media for signature creation. The example system 100 include employees 102, an example asset store circuitry 104, example automated capture tool circuitry 106, a meter 108, a server 112, example reference signature feedback circuitry 114, reference signature creation circuitry 116, and a candidate signature database 118.

The employees 102 of FIG. 1 represent any user that submits a reference signature request. As used herein, the term "reference signature request" includes information about a specific media and information describing the reference signature creation process for that media. A reference signature request is considered "complete" when the number of associated reference signatures generated by the example system meets a threshold. The contents of a reference signature request are explored further in FIG. 5.

In the example system 100, the employees 102 work for an example AME. In other examples, the employees 102 may represent a different entity or may represent themselves. The example system 100 shows three employees 102. In other examples, one or more employees 102 submit reference signature requests.

The example asset store circuitry 104 of FIG. 1 stores reference signature requests submitted by employees 102. The example asset store circuitry 104 coordinates access to the reference signature requests from the employees 102 and the example automated capture tool circuitry 106. When the status of a reference signature requests changes, information describing the change is stored in the example asset store circuitry 104. The example asset store circuitry 104 is explored further in FIGS. 2 and 5.

The example automated capture tool circuitry 106 of FIG. 1 receives a reference signature request from the example asset store circuitry 104 and plays the relevant media. In the example system 100, the example automated capture tool circuitry 106 is a physical computer or virtual machine. In some examples, the example automated capture tool circuitry 106 is any device that can access the network and play media. In the example system 100, three example automated capture tool circuitries 106 each play a media from the example asset store circuitry 104. In other examples, one or more of the example automated capture tool circuitries 106 may play a media from the example asset store circuitry 104.

Figure 2:
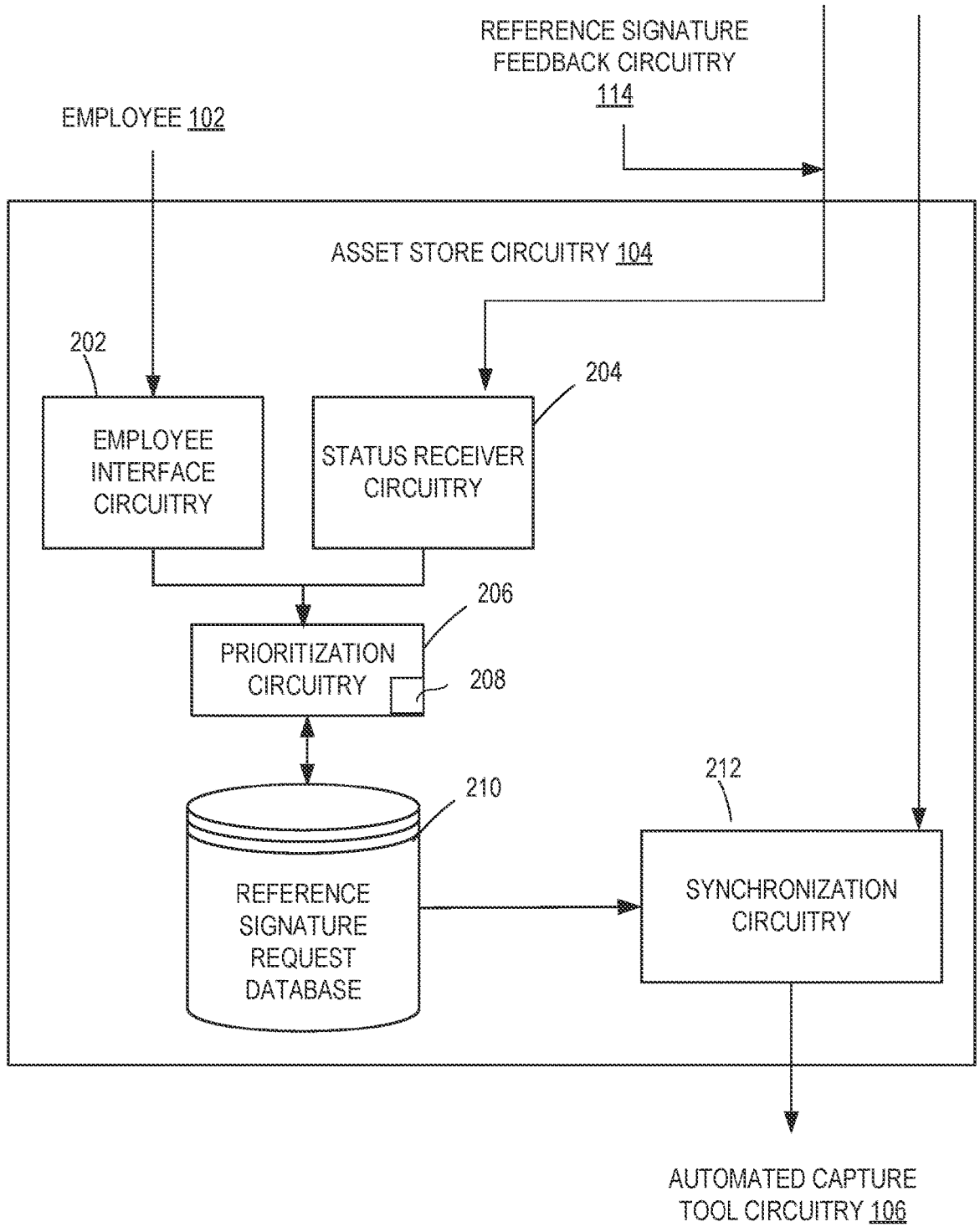
FIG. 2 is a block diagram of an example implementation of the example asset store circuitry of FIG. 1.

The example automated capture tool circuitry 106 is explored further in FIGS. 2 and/or 6.

In the example system 100, the example automated capture tool circuitry 106 is directly connected to the example asset store circuitry 104. This communication may be implemented through wired or wireless connections. In other examples, the automated capture tool circuitry 106 and example asset store circuitry 104 communicate via the network 110.

The meter 108 of FIG. 1 generates a signature from the media played by the automated capture tool circuitry 106. In some examples, the meter is external hardware that connects to the automated capture tool circuitry 106 via a wireless or wired connection. In other examples, the meter is a software application that runs on the device used by the example automated capture tool circuitry 106. There is one meter 108 for each automated capture tool circuitry 106. The example system 100 shows three meters. In some examples, one or more meters are used in a 1:1 ratio the number of automated capture tool circuitries 106 used to play media from the example asset store circuitry 104.

The network 110 of FIG. 1 connects and facilitates communication between the example asset store circuitry 104, meter 108, server 112, example reference signature feedback circuitry 114, reference signature creation circuitry 116, and candidate signature database 118. In this example, the network 110 is the Internet. However, the example network 110 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The server 112 of FIG. 1 is managed by an AME. The server 112 hosts machine readable instructions to implement the example asset store circuitry 104, example automated capture tool circuitry 106, meter 108, reference signature creation circuitry 116, example reference signature feedback circuitry 114, and candidate signature database 118 to operate and communicate with one another. Additionally, the server 112 may host circuitry that enables the AME to utilize the information stored in the candidate signature database 118. In some examples, the AME may use the information to create and publish ratings for various media. While, in the illustrated example, the server 112 is illustrated as a single device, the server 112 and/or any other processing devices described herein may be implemented by any number and/or type(s) of processors.

The reference signature creation circuitry 116 creates reference signature for a media using one or more signatures of the media. A reference signature can be created through any known means that utilize the one or more signatures. In some examples, the reference signature creation circuitry 116 chooses a signature from the one or more signatures to be the reference signature. In other examples, a reference signature is created using different portions of the one or more signatures.

AMEs are interested in creating reference signatures in a timely manner so that the creation and publishing of ratings can also be achieved in a timely manner. Therefore, the reference signature creation circuitry may choose a signature to be a reference signature as soon as it receives a signature that meets a quality threshold. If the quality threshold is not met within a certain number of signatures, the reference signature creation circuitry will generate a reference signature using the one or more signatures through any of the known methods described above.

The example reference signature feedback circuitry 114 communicates with the reference signature creation circuitry 116 to obtain information about the reference signature creation process. The example reference signature feedback circuitry then saves this information in the example asset store circuitry 104 via the network 110 to provide an accurate status on various reference signature requests. The example reference signature feedback circuitry 114 is explored further in FIGS. 3 and/or 6.

The candidate signature database 118 holds signatures for various media that may be used to create reference signatures. The reference signatures may be utilized by the example AME for the creation and publishing of ratings. The candidate signature database 118 of the illustrated is implemented by any memory, storage device and/or storage disc for storing data such as, for example, flash memory, magnetic media, optical media, solid state memory, hard drive(s), thumb drive(s), etc. Furthermore, the data stored in the candidate signature database 118 may be in any data format such as, for example, binary data, comma delimited data, tab delimited data, structured query language (SQL) structures, etc. While, in the illustrated example, the candidate signature database 118 is illustrated as a single device, the candidate signature database 118 and/or any other data storage devices described herein may be implemented by any number and/or type(s) of memories.

When an employee 102 submits a reference signature request, it is stored in the example asset store circuitry 104. The example automated capture tool circuitry 106 accepts the reference signature request from the example asset store circuitry 104 and plays the relevant media. During this media playback, an attached meter 108 attempts to generate a signature. If a signature is generated, the meter provides it to the reference signature creation circuitry 116 via the network 110, which determines whether to save it in the candidate signature database 118. If the signature is saved in the candidate signature database 118, it will be used to create a reference signature.

The example automated capture tool circuitry 106 updates the asset store to indicate if the signature creation was successful, and the example reference signature feedback circuitry 114 updates the asset store to indicate how many signatures are in the candidate signature database for a given reference signature request. The example reference signature feedback circuitry 114 also updates the asset store to indicate if the reference signature creation was successful. Using these status updates, the example asset store circuitry 104 can prioritize the remaining signature requests to be filled. Through this process, the example system 100 generates more signatures at a higher efficiency than known methods of manual signature generation.

FIG. 2 is a block diagram of an example implementation of the asset store circuitry of FIG. 1. The example asset store circuitry 104 includes example employee interface circuitry 202, example status receiver circuitry 204, example prioritization circuitry 206, an example reference signature request database 210, and example synchronization circuitry 212.

The example employee interface circuitry 202 of FIG. 2 communicates with employees 102 via the network 110. In some examples, an employee 102 may provide a new reference signature request to the employee interface circuitry. In other examples, the employee 102 may obtain status information about a particular reference signature request from the example employee interface circuitry 202. Any method of sharing information between circuitry and humans may be used to implement the example employee interface circuitry. In some examples, the example employee interface circuitry 202 implements a Graphical User Interface (GUI) to facilitate communication. In other examples, the example data receiver circuitry 302 implements a command line interface to facilitate communication.

When the example employee interface circuitry 202 receives a reference signature request, the circuitry generates a request ID and assigns it to the reference signature request. The request ID is any number or method that uniquely identifies the reference signature request. In some examples, the request ID may utilize architectures such as but not limited to an encryption key or a hash function. The example employee interface circuitry provides the reference signature request and assigned request ID to the example prioritization circuitry 206.

In some examples, the example asset store circuitry 104 includes means for receiving a plurality of reference signature requests. For example, the means for receiving may be implemented by example employee interface circuitry 202. In some examples, the example employee interface circuitry 202 may be implemented by machine executable instructions such as that implemented by at least blocks 502-506 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the automated capture tool circuitry 106 is implemented by other hardware logic circuitry, hardware implemented state machines, and/or any other combination of hardware, software, and/or firmware. For example, the automated capture tool circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example status receiver circuitry 204 of FIG. 2 receives a status update from the example automated capture tool circuitry 106 or the example reference signature feedback circuitry 114 via the network 110. The status update includes a request ID, which uniquely identifies a pre-existing reference signature request saved in the example reference signature request database 210, and new information regarding the completion of the request. Status updates from the example automated capture tool circuitry 106 are explored more in FIG. 3, and status updates from the example reference signature feedback circuitry 114 are explored more in FIG. 4. The example status receiver circuitry 204 provides the status update to the example prioritization circuitry 206.

In some examples, the example asset store circuitry 104 includes means for receiving a status update regarding the reference signature request. For example, the means for receiving may be implemented by example status receiver circuitry 204. In some examples, the example employee status receiver circuitry 204 may be implemented by machine executable instructions such as that implemented by at least blocks 530-540 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the automated capture tool circuitry 106 is implemented by other hardware logic circuitry, hardware implemented state machines, and/or any other combination of hardware, software, and/or firmware. For example, the automated capture tool circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example prioritization circuitry 206 accepts a reference signature request and assigns a priority to it. When receiving a new reference signature request from the employee interface circuitry, the example prioritization circuitry 206 assigns a new priority to the received request. In some examples, the priority is pre-determined by the employee 102 and included within the reference signature request. In other examples, the priority is not pre-determined, and the example prioritization circuitry 206 generates a priority. The generated priority is determined by an example priority rule set 208 and the priority of other requests within the example reference signature request database 210. The example priority rule set 208 is determined by AME and pre-programmed into the example asset store circuitry 104. The example priority rule set 208 may set rules through means, such as but not limited to a look up table, a machine learning model, etc. The example prioritization circuitry 206 stores the reference signature request, assigned request ID, and assigned priority together in the example reference signature request database 210.

When the example prioritization circuitry 206 receives a status update from the status receiver circuitry, the example prioritization circuitry 206 updates the priority of the pre-existing reference signature request that the status update refers to. This reference is made through the request ID that each status update has. The updated priority is determined by the example priority rule set 208, the priority of other requests within the example reference signature request database 210, and the status update. The example prioritization circuitry 206 stores the status update and the updated priority with the pre-existing reference signature request and request ID and in the example reference signature request database 210.

In some examples, the example asset store circuitry 104 includes means for prioritizing a plurality of reference signature requests amongst themselves. For example, the means for prioritizing may be implemented by example prioritization circuitry 206. In some examples, the example prioritization circuitry 206 may be implemented by machine executable instructions such as that implemented by at least blocks 546 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the automated capture tool circuitry 106 is implemented by other hardware logic circuitry, hardware implemented state machines, and/or any other combination of hardware, software, and/or firmware. For example, the automated capture tool circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example reference signature request database 210 of FIG. 2 stores reference signature requests, assigned request IDs, assigned priority values, and status updates that may be associated with a reference signature request. The example reference signature request database 210 of the illustrated is implemented by any memory, storage device and/or storage disc for storing data such as, for example, flash memory, magnetic media, optical media, solid state memory, hard drive(s), thumb drive(s), etc. Furthermore, the data stored in the example reference signature request database 210 may be in any data format such as, for example, binary data, comma delimited data, tab delimited data, structured query language (SQL) structures, etc. While, in the illustrated example, the example asset store circuitry 104 is illustrated as a single device, the example reference signature request database 210 and/or any other data storage devices described herein may be implemented by any number and/or type(s) of memories.

The example synchronization circuitry 212 receives a notice of completion of work from the example automated capture tool circuitry 106. A notice of completion of work is generated by an example automated capture tool circuitry 106 when it is ready to receive a new reference signature request. The example synchronization circuitry 212 finds the reference signature request with the highest priority and delivers both it and the associated request ID to the example automated capture tool circuitry 106. The example synchronization circuitry 212 also ensures that when a first automated capture tool circuitry 106 and a second automated capture tool circuitry 106 both send notices of completion of work at or near the same time, the same request is not delivered to both tools.

In some examples, the example asset store circuitry 104 includes means for means for assigning a reference signature request to an automated capture tool circuitry. For example, the means for assigning may be implemented by example synchronization circuitry 212. In some examples, the example synchronization circuitry 212 may be implemented by machine executable instructions such as that implemented by at least blocks 546 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the automated capture tool circuitry 106 is implemented by other hardware logic circuitry, hardware implemented state machines, and/or any other combination of hardware, software, and/or firmware. For example, the automated capture tool circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example asset store circuitry 104 is a singular location where reference signature requests are stored and maintained. Employees 102 within the example system 100 can utilize the example asset store circuitry 104 to add new reference requests and receive information from pre-existing requests. In doing so, the example asset store circuitry 104 provides a more efficient manner of storing and sharing information within the example system 100 than known methods of manually creating reference signatures.

Figure 3:
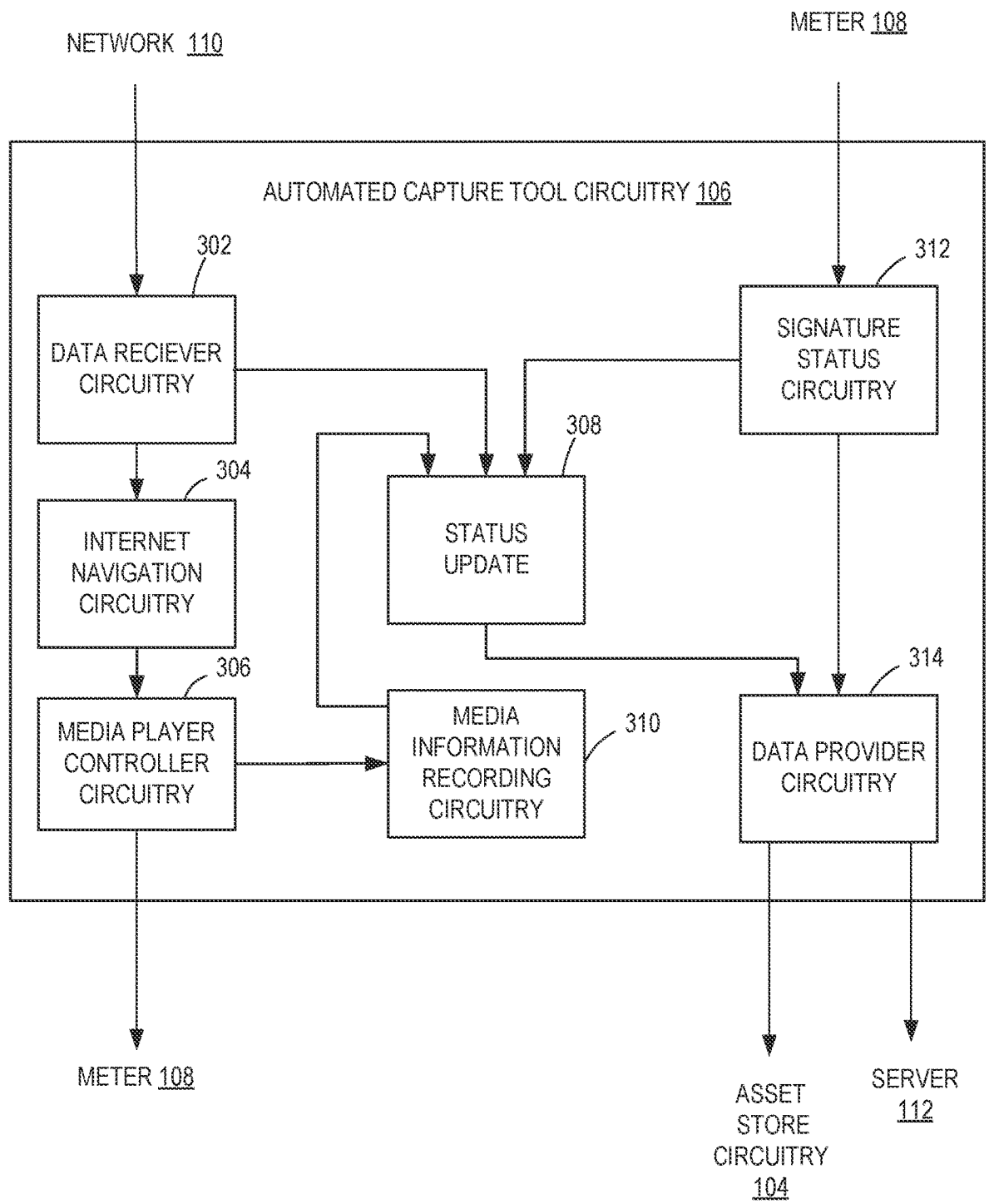
FIG. 3 is a block diagram of an example implementation of the automated capture tool circuitry of FIG. 1.

FIG. 3 is a block diagram of an example implementation of the automated capture tool circuitry of FIG. 1. The example automated capture tool circuitry 106 includes example data receiver circuitry 302, internet navigation circuitry 304, media player controller circuitry 306, a status update 308, media information recording circuitry 310, example signature status circuitry 312, and example data provider circuitry 314.

The example data receiver circuitry 302 of FIG. 3 receives a reference signature request from the example asset store circuitry 104 via the network 110. The information in the reference signature request includes the name of a media and the name of a streaming source. In the example system 100, the example data receiver circuitry 302 uses the name of a streaming source to request login credentials from the AME, which are stored on the server 112 and obtained via the network 110. In some examples, login credentials are stored in a different location. In other examples, login credentials are not required to access the media on the streaming source.

The internet navigation circuitry 304 of FIG. 3 receives the name of the media, name of the streaming source, and login credentials from the example data receiver circuitry 302. The internet navigation circuitry 304 uses the network to navigate to the streaming source and to the media. Specifically, the internet navigation circuitry navigates to a media player for the specified media. As used herein, the term "media player" refers to any software environment that plays media for viewing and offers controls. These controls include but are not limited to play, pause, fast forward, and rewind. In some examples, a media player may additionally include a 'skip' control for certain portions of the media, such as a theme song or end credits.

In some examples, the internet navigation circuitry 304 navigates to a media player on a website of a streaming source using a browser. In other examples, the internet navigation circuitry 304 navigates to a media player on a software application released by the streaming sources. The type of framework used to navigate to the streaming source depends on the reference signature request and the resources available on the machine containing the example automated capture tool circuitry. In some examples, the internet navigation circuitry 304 is implemented by a known automation tool such as Selenium®, Watir®, TestComplete®, etc. In other examples, the internet navigation circuitry is implemented by any system that automates internet access.

The media player controller circuitry 306 uses the controls from the media player to view the media. The controls used by the media player controller circuitry 306 follow the capture instructions included in the reference signature request obtained by the example data receiver circuitry 302. Capture instructions may be any type of operation capable of being executed by the media player controls. Examples of capture instructions include but are not limited to: play complete media from start to end, start the media at a first time interval and play until a second time interval, start the media at the beginning and play until the end credits roll, start the media when the end credits roll and play to end, select English, French, Spanish, or another language for capture, etc. The attached meter 108 uses the media playback generated by the media player controller circuitry 306 to attempt to generate a signature.

In some examples, the example asset store circuitry 104 includes means for playing a media described by a reference signature request. For example, the means for playing may be implemented by media player circuitry 306. In some examples, the media player circuitry 306 may be implemented by machine executable instructions such as that implemented by at least blocks 546 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the automated capture tool circuitry 106 is implemented by other hardware logic circuitry, hardware implemented state machines, and/or any other combination of hardware, software, and/or firmware. For example, the automated capture tool circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The media information recording circuitry 310 records status information and runtime information from the media player. The status information indicates whether the media player successfully played the media. If the media player was unable to play the media for any reason, this reasoning is captured in the status information. Reasons for the media player being unable to play the media may include but are not limited to the internet navigation circuitry 304 being unable to navigate to the streaming source, the listed streaming source not offering the media for viewing, and the streaming source website/software application failing to properly play the media.

In some examples, the media information recording circuitry 310 generates an alert whenever the media player is unsuccessful in playing media. An example alert may include the name of media, name of streaming session, time of failure, and reason for failure. An employee 102 who views the example alert may use the information to change a reference signature request in the asset store, and/or change the resources made available to the example automated capture tool circuitry 106. An example of a change in resources would be updating login credentials or installing a streaming source application to be used as an alternative to a streaming website.

Runtime information recorded by the media information recording circuitry 310 includes information to describe the media playback. Runtime information may include, but is not limited to, default language, media duration, title, episode, season, a total length of playback time, etc.

The example signature status circuitry 312 of FIG. 3 receives status information from the meter 108. The status information indicates whether a complete signature was successfully formed. If a complete signature was not formed, a reason for failure is included in the status information. If a partial signature was formed, the length of the signature is included in the status information. If any amount of a signature is formed, the example signature status circuitry 312 receives a signature ID from the meter which uniquely identifies the signature.

The example data provider circuitry 314 of FIG. 3 receives status information and runtime information from the media player via the media information recording circuitry 310, as well as status information from the meter via the example signature status circuitry 312. This information is collectively referred to as a status update in FIG. 2. The example data provider circuitry 314 provides the status update to the example asset store circuitry 104 via the network 110.

The example data provider circuitry 314 of FIG. 3 also receives the request ID from the example data receiver circuitry 302 and the signature ID from the example signature status circuitry 312. These IDs are sent together to the reference signature creation circuitry 116 via the network 110, so that the example network can identify which reference signature request generated a given incoming signature.

The example automated capture tool circuitry 106 of FIG. 3 receives a reference signature request and plays media so that an attached meter may attempt to generate a signature. It also records relevant information from the media player and meter and saves them in the example asset store circuitry 104 so that each reference signature request has an accurate status and can be prioritized accordingly. By doing so, the automated capture tool circuitry 106 removes the need for an employee 102 to play a media, control the media, record status updates, and provide the information manually.

Figure 4:
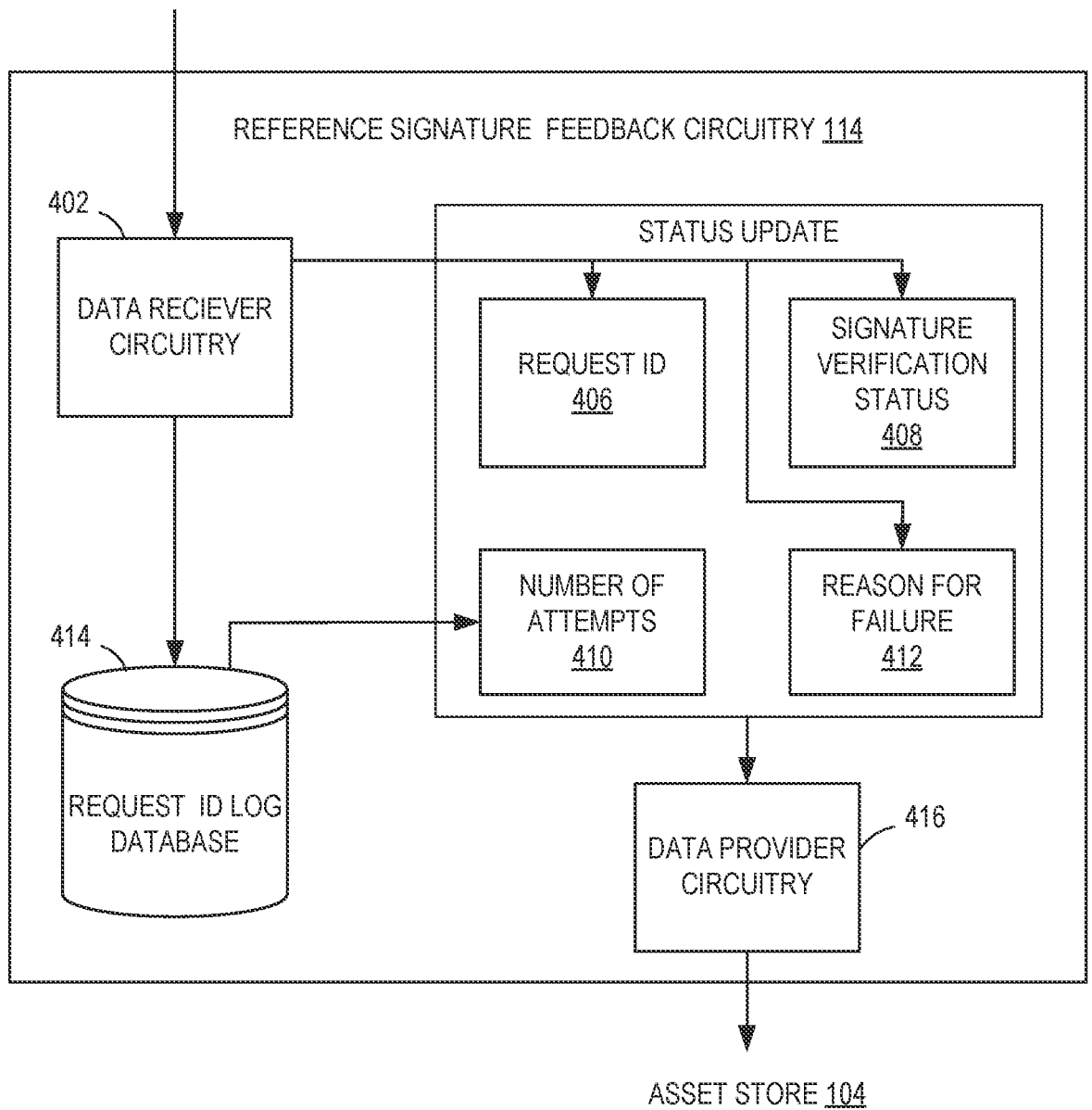
FIG. 4 is a block diagram of an example implementation of the reference signature feedback circuitry of FIG. 1.

FIG. 4 is a block diagram of an example implementation of the reference signature feedback circuitry of FIG. 1. The example reference signature feedback circuitry 114 includes example data receiver circuitry 302, a status update 404, an example request ID log database 414, and example data provider circuitry 314.

When a meter 108 generates a signature, it is sent via the network 110 to the reference signature creation circuitry 116 managed by the example AME. An associated request ID and signature ID are also sent to the reference signature creation circuitry 116 via the network 110. The reference signature creation circuitry 116 attempts to add the signature to the candidate signature database 118 and to generate a reference signature. When an attempt is made, the reference signature creation circuitry 116 sends information to the example reference signature feedback circuitry 114. This information is received by the example data receiver circuitry 302. The information may include but is not limited to a request ID 406, signature verification status 408, and the reason for failure 412 if applicable.

The signature verification status 408 indicates whether the reference signature creation circuitry 116 successfully added the received signature to the candidate signature database. If the signature verification status 408 indicates the received signature was not added, a reason for failure 412 is provided in the status update. Reasons for failure include but are not limited to the signature being a duplicate, or the signature being poor quality.

The example request ID log database 414 stores request IDs, and how many signatures the example reference signature creation circuitry 116 has received with said request ID 406. The example request ID log database 414 of the illustrated is implemented by any memory, storage device and/or storage disc for storing data such as, for example, flash memory, magnetic media, optical media, solid state memory, hard drive(s), thumb drive(s), etc. Furthermore, the data stored in the example request ID log database 414 may be in any data format such as, for example, binary data, comma delimited data, tab delimited data, structured query language (SQL) structures, etc. While, in the illustrated example, the example request ID log database 414 is illustrated as a single device, the example request ID log database 414 and/or any other data storage devices described herein may be implemented by any number and/or type(s) of memories.

When the example data receiver circuitry 402 receives a request ID from the reference signature creation circuitry 116, it finds the request ID in the example request ID log database 414 and adds 1 to the value describing how many signatures with the same request ID have been received. This new value becomes the number of attempts 410, which describe the total number of times the example reference signature creation circuitry has tried creating a reference signature for the given request ID 406.

The example data provider circuitry 314 receives the request ID 406, signature verification status 408, number of attempts 410, and reason for failure 412 from the example data receiver circuitry 302. This information is collectively referred to as the status update 404. The example data provider circuitry 314 provides the status update 404 to the example asset store circuitry 104 via the network 110. In doing so, the reference signature feedback circuitry creates a feedback loop that keeps the example asset store circuitry 104 up to date with the reference signature creation process. This information can be accessed by the employee 102 or used to further update various priorities of reference signature requests within the example asset store circuitry 104.

FIG. 5 is an example data set that may be stored in the example asset store circuitry of FIG. 1. The example data set 500 includes three rows, 502, 504, 506, where each row include a request ID field 508, a streaming source field 510, a media title field 512, a season field 514, an episode field 516, a media duration field 518, a media approved by streaming source field 520, a media created by streaming source field 522, a languages required field 524, a capture instructions field 526, a schedule capture date field 528, a requested signature type field 529, an actual capture date field 530, status of signature capture field 532, reason for failure field 534, added to candidate signature database field 536, reason for signature not being added field 538, a number of attempts field 540, a number of signatures recorded field 542, a number of signatures needed field 544, and a priority field 546. In the illustrated example of FIG. 5, the example data set 500 is displayed in two sections for readability. However, both sections represent the same example data set 500. In practice, the example asset store circuitry 104 saves and formats information as described in the example reference signature request database 210 of FIG. 2.

Each reference signature request has an associated request ID field 508. While the example data set 500 uses the values 1, 2, and 3 for simplicity, in practice the request ID may be any value used to uniquely identify a reference signature request.

Each reference signature request includes fields that describe the media. In the example data set 500, a streaming source field 510, a title field 512, a season field 514, an episode field 516, and a duration field 518 define the media. The example asset store circuitry 104 also indicates, for each reference signature request, whether the media was provided to the by a streaming source, field 520, and if the media was created by the streaming source, field 522. The field 522 is relevant because media created by a streaming source is only available on said streaming source. In other examples, other parameters such as genre, etc. may be used to describe the media information.

The example data set 500 includes a Languages Required field 524 in each reference signature request. Because the meter 108 generates signatures based on the audio/visual content produced by the media playback, a signature for a media in one language is not interchangeable with a signature for the same media in a different language. Therefore, in the example asset store circuitry 104, a reference signature request may require a multitude of reference signatures to be generated, where the multitude is based in part on the number of required languages in field 524.

The example data set 500 includes a capture instructions field 526 for each reference signature request. The capture instructions field 526 are used by the media player controller circuitry 306 to properly play the media. Capture instructions may include any type of control available on a media player. For example, the reference signature request 502 indicates that one or more signatures be generated in which the entire duration of Black Widow® is played. In another example, the reference signature request 504 indicates that the media player controller circuitry 306 presses the 'skip' button for the end credits of The Tomorrow War®, so that the signature generated by the meter does not include that portion of the media. In yet another example, the reference signature request 506 indicates signatures for The Good Place® S1E4 be generated, in which the media is fast-forwarded to 00:02:30 (time indicated in hours:minutes:seconds format). In other examples, reference signature requests may include other capture instructions.

The example data set 500 includes a scheduled capture date field 528 for each reference signature request. The scheduled capture date indicates when the employees 102 would like the media to be played and the signatures to be captured. Because AMEs require reference signatures in a timely manner, in the example data set 500 all the scheduled capture date field 528 match the day the media of field 512 was released on the streaming source of field 510. In some examples, the scheduled capture date may be a different date.

The example data set 500 includes a requested signature type field 529 for each reference signature request. The requested signature type field 529 indicates one or more types of signatures that the example automated capture tool circuitry 106 generates to form a reference signature request. Example signature types may include, but are not limited to, Nielsen® Passive Audio Signature (PAS)®, Nielsen® Digital Audio Signature Hybrid (nDash)®, Nielsen® StreamFP®, Nielsen® Unitam®, etc.

In the example asset store circuitry 104, a reference signature request may require a multitude of reference signatures to be generated, where the multitude is based on the number of requested signature types in field 529 and the number of languages required in field 524. In other examples, each combination of language and signature type requested for a given media is its own reference signature request, and one reference signature is generated per reference signature request.

The example data set 500 includes an actual capture date field 530, a status of signature capture field 532, and a reason for failure field 534. The status of signature capture field 532 indicates whether the latest attempt to create a signature was successful. If a complete signature was unsuccessfully created, an explanation is stored in reason for failure field. A complete signature may fail to be generated for any reason. For example, a signature failed in reference signature request 502 because the media player froze during the viewing of the media.

The information in the actual capture date field 530, the status of signature capture field 532, and the reason for failure field 534 is provided to the asset store as a status update from the example automated capture tool circuitry 106. The example asset store circuitry 104 may utilize the information in the actual capture data field 530, the status of signature capture field 532, and/or the reason for failure field 534 when determining priority for reference signature requests. In the example data set, fields in the capture date field 530, the status of signature capture field 532, and the reason for failure field have one entry per reference signature for simplicity, which represents the latest attempt to create a signature. In other examples, a single reference signature request may have multiple entries for the capture date field 530, the status of signature capture field 532, and the reason for failure field 534, where each entry represents information from one attempt to create a signature for the given reference signature request.

The example data set 500 indicates if the latest signature was added to the candidate signature database 118, field 536. Additionally, field 538 holds a reason for why the latest signature was not added (if applicable). While every signature generated by the example system 100 is created with the intent that it is used to generate a reference signature, some signatures may not be added to the candidate signature database 118. A signature may not be added for any reason. For example, the signature may not be created properly due to meter error, as seen in reference signature request 502, the signature may be a duplicate, as seen in reference signature request 504, etc.

The information from the candidate signature database field 536 and field 538 is provided to the example asset store circuitry 104 as part of a status update by the example reference signature feedback circuitry 114. In the example data set, the candidate signature database field 536 and field 538 have one entry per reference signature for simplicity, which represents information from the latest signature. In other examples, a single reference signature request could have multiple entries for the candidate signature database field 536 and field 538, where each entry represents information from each signature for the given reference signature request.

The example data set 500 indicates a number of attempts field 540 and a how many signatures have been recorded field 542. Field 540 describes how many times the reference signature creation circuitry 116 attempted to add a signature to the candidate signature database 118. Field 542 counts the number of signatures in the candidate signature database. The number of signatures recorded, field 542, is therefore equal or less than the number of attempts, field 540, for the same reference signature request. Fields 540 and field 542 are provided to the asset store as part of a status update by the example reference signature feedback circuitry 114.

The example asset store circuitry 104 stores a priority with each reference signature request, field 546. In the example data set 500, priority is categorized as "High", "Low", or "N/A" for simplicity. In other examples, any numbering or ranking method may be used to prioritize the reference signature requests. The information from field 536, field 538, field 540, and field 542 is provided to the example asset store circuitry 104 as part of a status update by the example reference signature feedback circuitry 114.

The example data set 500 indicates how many total signatures are needed, field 544. The number of signatures needed is determined by the number of signatures needed per reference signature, and the number of reference signatures needed. In the example data set 500, the reference signature creation circuitry 116 will generate a reference signature for a media once four signatures of the media are stored in the candidate signature database 118.

Because there are four ways to combine the number of languages and number of signature types in the reference signature request 502 (English (EN) and PAS®, EN and nDash®, French (FR) and PAS®, FR and nDash®), and each combination requires four signatures for a reference signature be created, the in the reference signature request 502 requires a total of sixteen signatures to be successfully generated. Using the same logic, reference signature request 504 requires twelve total signatures, and reference signature request 506 requires sixteen total signatures. The example data set 500 includes four signatures needed per reference signature for simplicity. In other examples, any number of signatures may be required to generate a reference signature. In other examples, the number of signatures required to generate a reference signature may differ between reference signature requests.

In the example data set 500, one reference signature is created for every four reference signatures, for simplicity. In some examples, a reference signature may be generated before a specified number of signatures is generated if one of the existing signatures meets a quality threshold. In these examples, the number of reference signatures generated may not be determined from the number of signatures generated, so the example asset store circuitry 104 may additionally include a field indicating how many reference signatures have been generated.

The example asset store circuitry 104 uses the status updates of fields 530, 532,534, 536, 538, 540, 542, the contents of the reference signature request, (fields 510, 512, 514, 516, 518, 520, 522, 524, 536, 528, 529), the number of signatures needed (field 544), and the example priority rule set 208 to determine priority amongst reference signature requests field 546. For example, the example data set 500 shows reference signature request 502 having a high priority in part because only seven out of sixteen signatures have been completed. In contrast, the example asset store circuitry 104 assigns a priority "N/A" to reference signature request 506 because all sixteen signatures have been generated and the four reference signatures have been formed. The priority of "N/A" indicates that reference signature request 506 is complete and should not be assigned to another automated capture tool circuitry 106. In other examples, the example AME includes in the example priority rule set 208 that a media from certain streaming sources should always receive high priority, so the example priority rule set 208 may additionally or alternatively use field 510 from the reference signature requests when determining priority.

While an example manner of implementing the automated capture tool circuitry 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example data receiver circuitry, internet navigation circuitry 304, the example media player controller circuitry 306, example media information recording circuitry 310, example signature status circuitry 312, data provider circuitry 314, and/or, more generally, the example automated capture tool circuitry 106 of FIG. 1, may be implemented by hardware, software, firmware, and/or any combination of hardware, software, and/or firmware. Thus, for example, any of the example data receiver circuitry, internet navigation circuitry 304, the example media player controller circuitry 306, example media information recording circuitry 310, example signature status circuitry 312, data provider circuitry 314, and/or, more generally, the example automated capture tool circuitry 106 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data receiver circuitry, internet navigation circuitry 304, the example media player controller circuitry 306, example media information recording circuitry 310, example signature status circuitry 312, data provider circuitry 314, and/or, more generally, the example automated capture tool circuitry 106 of FIG. 1, is/are hereby expressly defined to include a non-transitory computer readable storage device or storage disk such as a memory, a digital versatile disk (DVD), a compact disk (CD), a Blu-ray disk, etc., including the software and/or firmware. Further still, the example automated capture tool circuitry 106 of FIG. 1 may include one or more elements, processes, and/or devices in addition to, or instead of, those illustrated in FIG. 3, and/or may include more than one of any or all of the illustrated elements, processes and devices.

Figure 6:
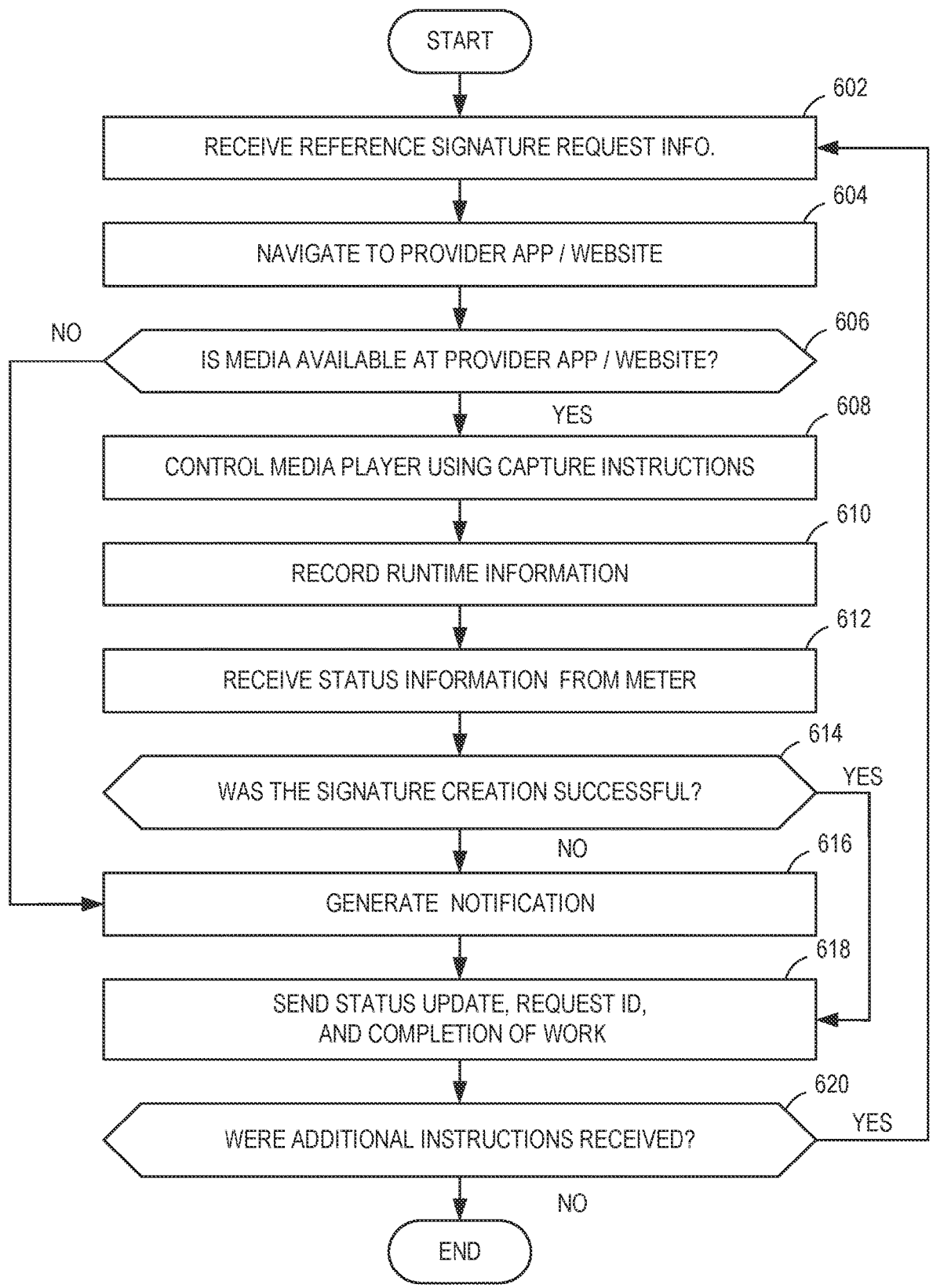
FIG. 6 is a flowchart representative of example machine readable instructions that may be executed by example processor circuitry to implement the automated capture tool circuitry of FIG. 1.

A flowchart representative of example hardware logic circuitry, machine readable instructions, hardware implemented state machines, and/or any combination thereof for implementing the automated capture tool circuitry 106 of FIG. 1 is shown in FIG. 6. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example automated capture tool circuitry 106 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

Figure 7:
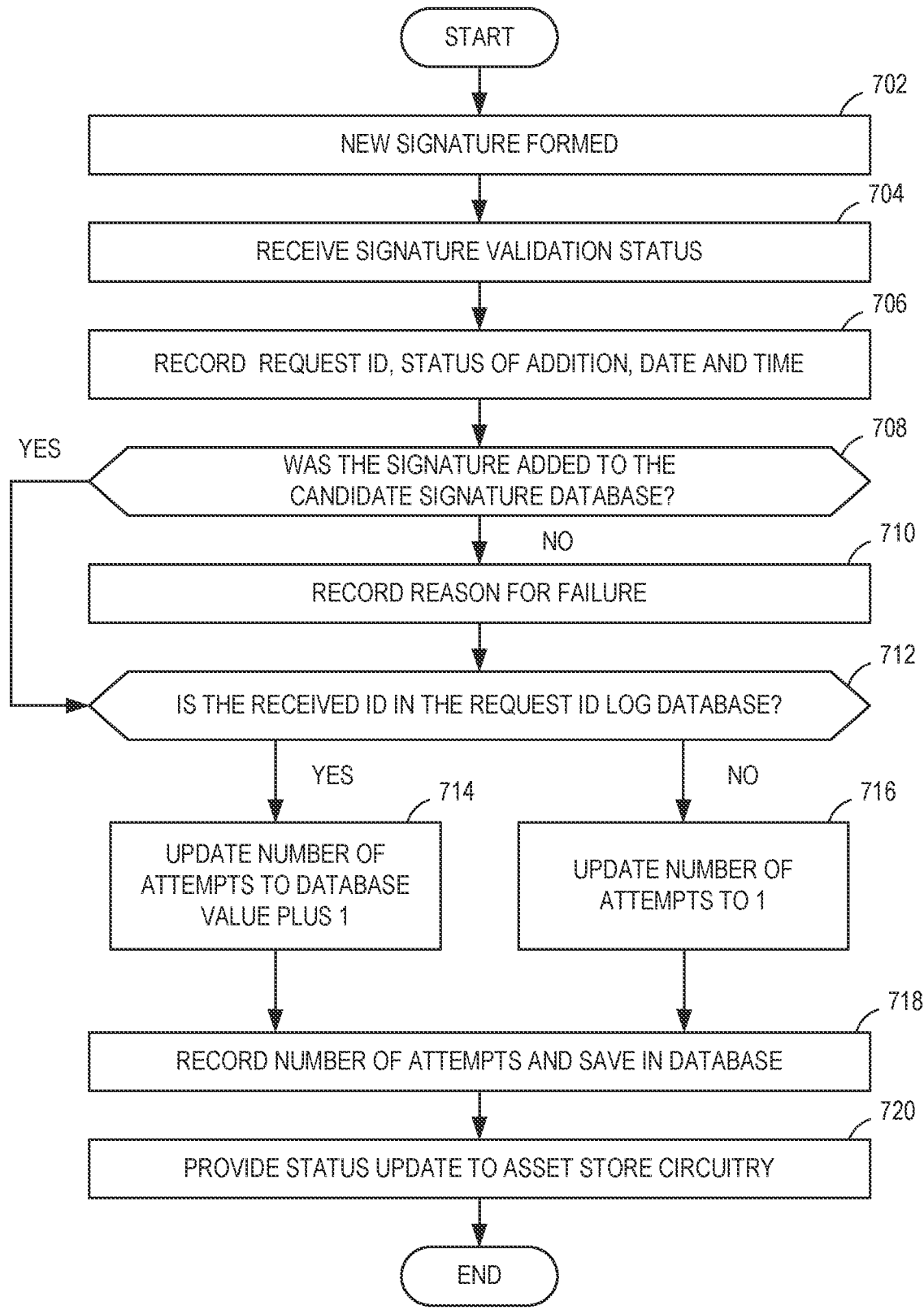
FIG. 7 is a flowchart representative of example machine readable instructions that may be executed by example processor circuitry to implement the reference signature feedback circuitry of FIG. 1.

A flowchart representative of example hardware logic circuitry, machine readable instructions, hardware implemented state machines, and/or any combination thereof for implementing the reference signature feedback circuitry 114 of FIG. 1 is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example reference signature feedback circuitry 114 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions that may be executed by example processor circuitry to implement the example automated capture tool circuitry 106 of FIG. 1. The example process 600 begins when the example data receiver circuitry 302 receives a reference signature request. (Block 602). The reference signature request is sent from the example asset store circuitry 104 via the network.

The internet navigation circuitry 304 of FIG. 2 navigates to a provider app or website. (Block 604). In the example process 600, the terms "provider" and "streaming source" are interchangeable. The internet navigation circuitry 304 uses the name of the streaming source listed in the received reference signature request to determine which provider app or website to navigate to.

The example automated capture tool circuitry 106 determines if the media listed in the received reference signature request is available at the provider app or website. (Block 606). If the media is not available, the example process 600 proceeds to block 616 and generates a notification, which is explored later in this disclosure.

If the media listed in the received reference signature request is available at the provider app or website at the decision block 606, the media player controller circuitry 306 controls the media player using capture instructions. (Block 608). The capture instructions are part of the received reference signature request. Example capture instructions can be found in FIG. 5.

The media information recording circuitry 310 records runtime information while the media plays. (Block 610). Runtime information may include, but is not limited to, default language, media duration, title, episode, season, total length of playback time, etc.

The meter 108 connected to the example automated capture tool circuitry 106 attempts to generate a signature while the media plays. When the signature creation process ends, the example signature status circuitry 312 receives status information from the meter. (Block 612). The status information includes at least an indication of whether a signature was successfully created. Further examples of the contents of the status information are explored in FIG. 3.

The example automated capture tool circuitry 106 determines from the status information if the signature was successfully created. (Block 614). If the signature creation was not successful, a notification is generated. (Block 616). The example notification may indicate any type of error. For example, the notification may indicate that a media was unavailable at a streaming source app or web site. (Block 606). Alternatively, the notification may indicate that a signature was not created successfully. If a reason for failure is included in the status information from the meter 108, it may also be included in the notification.

In the example system 100, a notification occurs when the example automated capture tool circuitry 106 provides a message to the example asset store circuitry 104 via the network. The example asset store circuitry 104 then provides the message to the employee 102 via the example employee interface circuitry 202. In the example system 100, a notification may trigger one or more interrupt routines in the example asset store circuitry 104 and/or the example automated capture tool circuitry 106, causing the message to be delivered before further processing occurs. In other examples, the example automated capture tool circuitry 106 may have its own interface circuitry that is used to convey a notification to the employee 102.

Once a notification is generated in block 616, or if the signature was created successfully and a notification was not needed following decision block 614, the example automated capture tool circuitry 106 sends a status update, request ID, and a completion of work to the example asset store circuitry. (Block 618). The contents of the status update include status information and runtime information from the media player via the media information recording circuitry 310, as well as status information from the meter via the example signature status circuitry 312. The request ID is part of the received reference signature request information and serves to uniquely identify the reference signature request.

The completion of work indicates that the example automated capture tool circuitry 106 is ready to receive additional instructions.

The example automated capture tool circuitry 106 checks to see if additional instructions were received from the example asset store circuitry. (Block 620). If no additional information is received, then the example process 600 ends. If additional information is received, then the example process 600 continues at block 602 by receiving new reference signature request information.

FIG. 7 is a flowchart representative of example machine readable instructions that may be executed by example processor circuitry to implement the reference signature feedback circuitry of FIG. 1. The example process 700 begins when a new signature is formed. (Block 702). The meter 108 generates the signature and provides it to the reference signature creation circuitry 116 via the network 110.

The reference signature creation circuitry 116 determine whether to add the received signature to the candidate signature database 118. When this occurs, the example reference signature feedback circuitry 114 receives a signature validation status. (Block 704). The signature validation status is generated by the example reference signature creation circuitry 116 and describes what was done to the received signature.

The example reference signature feedback circuitry 114 records the status of addition, date, and time. (Block 706). In the example process 700, the act of "recording" a parameter means that the example reference signature feedback circuitry 114 saves the parameter at least temporarily in local memory, and that the parameter will be part of a status update. The status of addition from block 706 indicates whether the reference signature creation circuitry 116 added the signature to the candidate signature database 118.

The example reference signature feedback circuitry 114 checks the status of addition to see if the received signature was added. (Block 708). If the received signature is not added, a reason for failure is recorded. (Block 710). A signature could fail to be added for any reason. Example reasons include but are not limited to the signature being a duplicate, or the signature being poor quality. A reason for failure, if applicable, is included in the signature validation status of block 706. If the received signature is added, the example process 700 skips block 710.

The example reference signature feedback circuitry 114 checks to see if the received request ID is in the example request ID log database 414 of FIG. 4. (Block 712). Each signature validation status of block 706 includes a request ID that uniquely determines which reference signature request the information pertains to. Every request ID stored in the request ID log database 414 has a number of attempts stored with it.

If the received request ID is listed in the example request ID log database 414, the example reference signature feedback circuitry 114 updates the number of attempts to be one greater than the value stored in the database. (Block 714). If the received request ID is not listed in the request ID log, the number of attempts is updated to one. (Block 716).

The example reference signature feedback circuitry 114 records the updated number of attempts. (Block 718). The received request ID and the updated number of attempts is also saved in the example request ID log database 414. (Block 718). The number of attempts indicates how many times the reference signature creation circuitry 116 attempted to add a signature to the candidate signature database 118. In the example data set 500, where a reference signature for a media is not created until four signatures for the media are added to the candidate signature database 118, a completed reference signature request will have a number of attempts equal to or greater than the number of signatures required. In other examples, where a reference signature for a media may be generated after any number of signatures of said media are added to the candidate signature database 118, the number of attempts may be less than, equal to, or greater than the number of attempts.

The information recorded throughout the example process 700 collectively comprise a status update. The example reference signature feedback circuitry 114 provides this status update to the example asset store circuitry 104 so that employees 102 can have updated and complete information for all stages of the reference signature creation process. When the status update is provided, the example process 700 ends.

Figure 8:
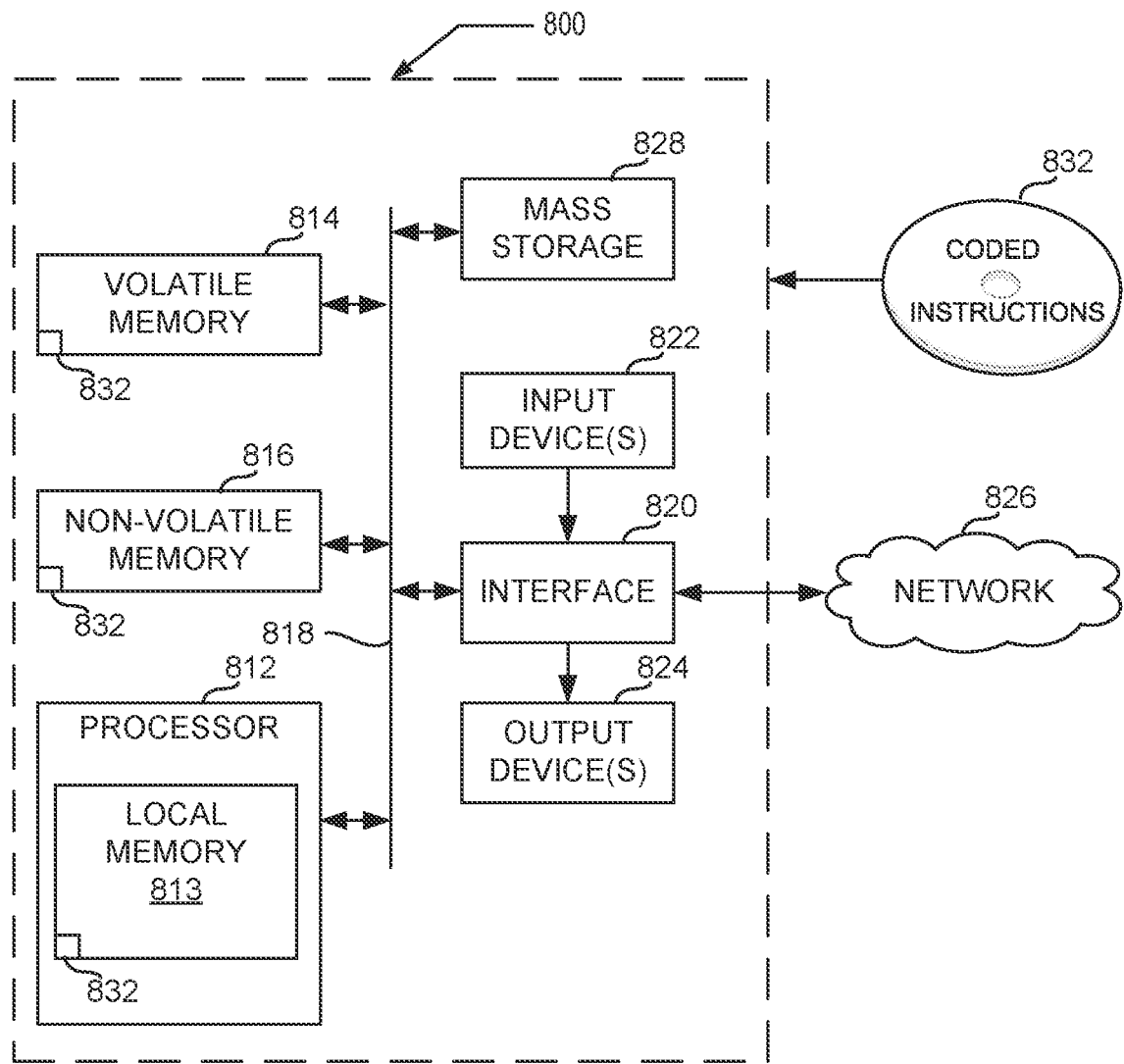
FIG. 8 is a block diagram of an example processing platform including processor circuitry structured to execute the example machine readable instructions of FIG. 3 to implement the example system of FIG. 1.

FIG. 8 is a block diagram of an example processor platform 800 structured to execute and/or instantiate the machine readable instructions and/or operations of FIGS. 6 and/or 7 to implement the system of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements example asset store circuitry 104, example automated capture tool circuitry 106, meter 108, server 112, example reference signature feedback circuitry 114, and reference signature creation circuitry 116.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 6 and/or 7, may be stored in the mass storage device 828, in the volatile memory 814, in the non-volatile memory 816, and/or on a removable non-transitory computer readable storage medium such as a CD or DVD.

Figure 9:
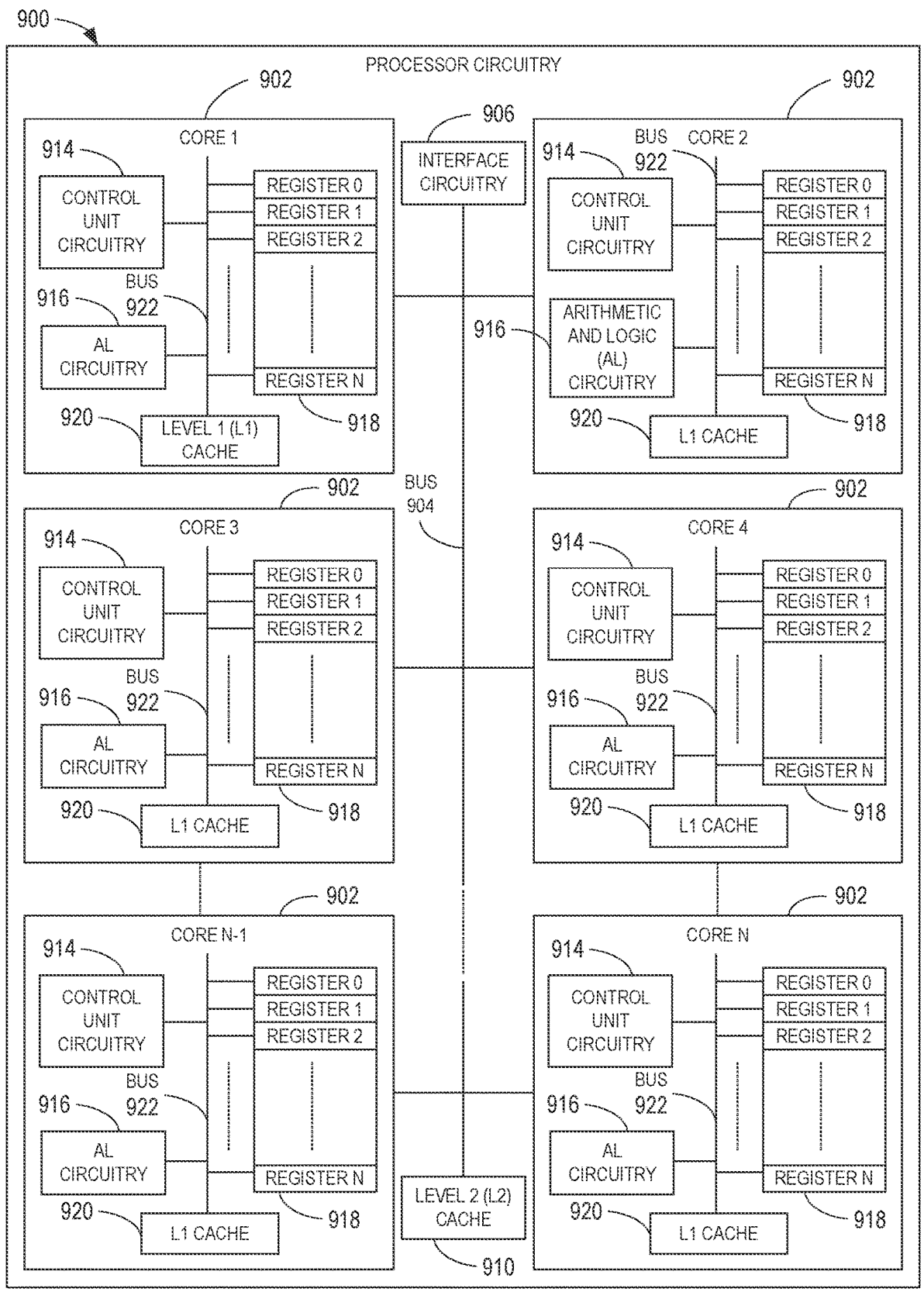
FIG. 9 is a block diagram of an example implementation of the processor circuitry of FIG. 4.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and/or 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
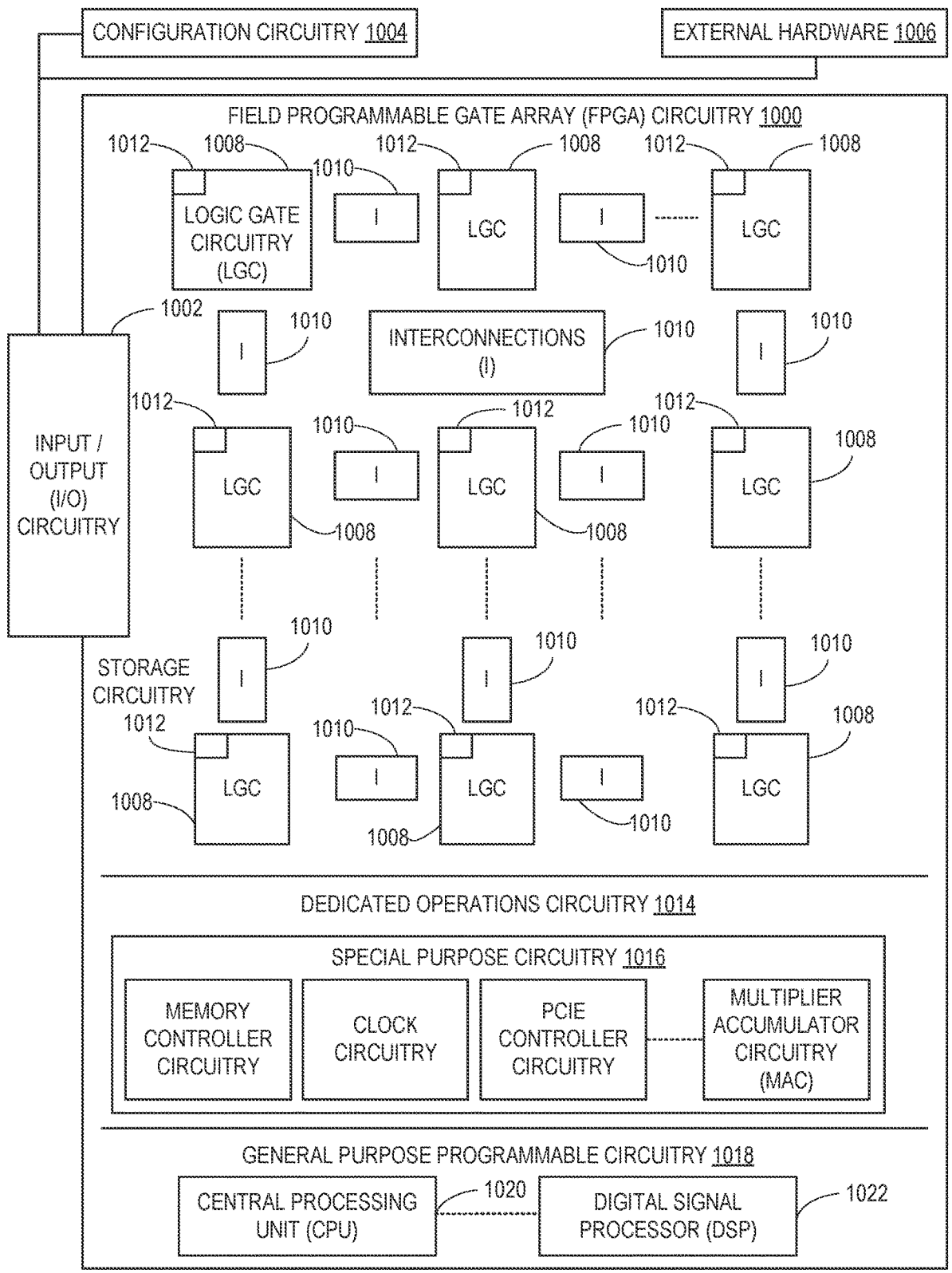
FIG. 10 is a block diagram of another example implementation of the processor circuitry of FIG. 4.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6 and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6 and/or 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and/or 7. As such, the FPGA circuitry 1000 may be structured to effectively instantiate some or all of the machine readable instructions of the flowcharts of FIGS. 6 and/or 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6 and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6 and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6 and/or 7 may be executed by one or more of the cores 902 of FIG. 9 and a second portion of the machine readable instructions represented by the flowcharts of FIGS. 6 and/or 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 900 of FIG. 9 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
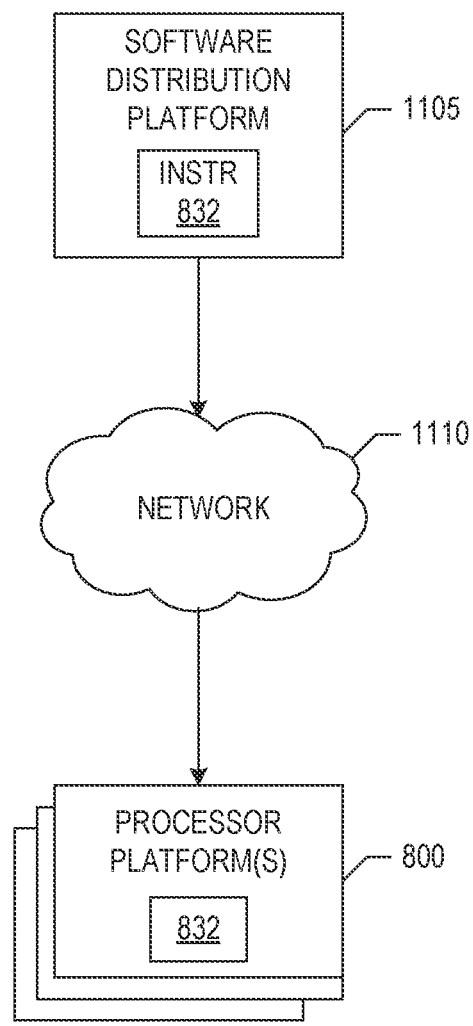
FIG. 11 is a block diagram of an example software distribution platform (e.g., one or more servers) to distribute software (e.g., software corresponding to the example machine readable instructions of FIGS. 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 602-620 of FIG. 6 as described above. The one or more servers of the example software distribution platform 1105 are in communication with a network 1110, which may correspond to any one or more of the Internet and/or any of the example networks 110 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 602-620 of FIG. 6, may be downloaded to the example processor platform 800, which is to execute the machine readable instructions 832 to implement the example automated capture tool circuitry 106. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that automate the recording of media for signature creation. The disclosed systems, methods, apparatus, and articles of manufacture improve the efficiency of using a computing device by automatically prioritizing and assigning requests for reference signature creation. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to automate the recording of media for signature creation are disclosed herein. Further examples and combinations thereof include the following:

Example 1 includes an apparatus to automate recording of media for signature creation comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate employee interface circuitry to receive a plurality of reference signature requests, prioritization circuitry to prioritize a plurality of reference signature requests amongst themselves, synchronization circuitry to assign a reference signature request to an automated capture tool circuitry, the reference signature request being one of the plurality of reference signature requests, the assignment in response to the prioritization, automated capture tool circuitry to play media, the media described by the reference signature request, and status receiver circuitry to receive a status update regarding the reference signature request.

Example 2 includes the apparatus of example 1, wherein the synchronization circuitry is to assign the reference signature with the highest prioritization amongst the plurality of reference signature requests to the automated capture tool circuitry.

Example 3 includes the apparatus of example 1, wherein the status update is to indicate whether a complete signature was successfully created.

Example 4 includes the apparatus of example 1, wherein the status update is to provide an indication of whether a completed signature was considered for use as a reference signature.

Example 5 includes the apparatus of example 4, wherein the prioritization circuitry is to further change the prioritization of the plurality of the reference signature requests, the change in response to the indication that the completed signature was considered for use as a reference signature.

Example 6 includes the apparatus of example 1, wherein the employee interface circuitry is to provide the status update to an employee.

Example 7 includes at least one non-transitory machine-readable medium comprising instructions that, when executed, cause at least one processor to at least receive a plurality of reference signature requests, prioritize a plurality of reference signature requests amongst themselves, assign a reference signature request to an automated capture tool circuitry, the reference signature request being one of the plurality of reference signature requests, the assignment in response to the prioritization, play media described by the reference signature request, and receive a status update regarding the reference signature request.

Example 8 includes the at least one non-transitory machine-readable medium of example 7, wherein the instructions, when executed, cause the at least one processor to assign the reference signature with the highest prioritization amongst the plurality of reference signature requests to the automated capture tool circuitry.

Example 9 includes the at least one non-transitory machine-readable medium of example 7, wherein the status update is to indicate whether a complete signature was successfully created.

Example 10 includes the at least one non-transitory machine-readable medium of example 7, wherein the status update is to provide an indication of whether a completed signature was considered for use as a reference signature.

Example 11 includes the at least one non-transitory machine-readable medium of example 10, wherein the instructions, when executed, cause the at least one processor to change the prioritization of the plurality of the reference signature requests in response to the indication that the completed signature was considered for use as a reference signature.

Example 12 includes the at least one non-transitory machine-readable medium of example 7, wherein the instructions, when executed, cause the at least one processor to provide the status update to an employee.

Example 13 includes an apparatus to automate recording of media for signature creation comprising, the apparatus comprising means for receiving a plurality of reference signature requests, means for prioritizing a plurality of reference signature requests amongst themselves, means for assigning a reference signature request to an automated capture tool circuitry, the reference signature request being one of the plurality of reference signature requests, the assignment in response to the prioritization, means for playing a media, the media described by the reference signature request, and means for receiving a status update regarding the reference signature request.

Example 14 includes the apparatus of example 13, wherein the means for assigning the reference signature further includes assigning the highest prioritization amongst the plurality of reference signature requests to the automated capture tool circuitry.

Example 15 includes the apparatus of example 13, wherein the status update is to indicate whether a complete signature was successfully created.

Example 16 includes the apparatus of example 13, wherein the status update is to provide an indication whether a completed signature was considered for use as a reference signature.

Example 17 includes the apparatus of example 16, wherein the means for means for prioritizing a plurality of reference signature requests amongst themselves further includes means for changing the prioritization of the plurality of the reference signature requests, the change in response to the indication that the completed signature was considered for use as a reference signature.

Example 18 includes the apparatus of example 13, further including means for providing the status update to an employee.

Example 19 includes a method to automate recording of media for signature creation, the method comprising receiving a plurality of reference signature requests, prioritizing a plurality of reference signature requests amongst themselves, assigning a reference signature request to an automated capture tool circuitry, the reference signature request being one of the plurality of reference signature requests, the assignment in response to the prioritization, playing a media, the media described by the reference signature request, and receiving a status update regarding the reference signature request.

Example 20 includes the method of example 19, wherein assigning the reference signature further includes assigning the highest prioritization amongst the plurality of reference signature requests to the automated capture tool circuitry.

Example 21 includes the method of example 19, wherein the status update is to indicate whether a complete signature was successfully created.

Example 22 includes the method of example 19, wherein the status update is to provide an indication of whether a completed signature was considered for use as a reference signature.

Example 23 includes the method of example 22, wherein prioritizing a plurality of reference signature requests amongst themselves further includes changing the prioritization of the plurality of the reference signature requests, the changing in response to the indication if a completed signature was considered for use as a reference signature.

Example 24 includes the method of example 19, wherein the method further includes providing the status update to an employee.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to automate recording of media for signature creation comprising:
   memory; and
   processor circuitry including one or more of:
   at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
   Application Specific Integrate Circuitry (ASIC) including logic gate circuitry to perform one or more third operations;
   the processor circuitry to perform at least one of the first operations, the second operations or the third operations to instantiate:
   employee interface circuitry to receive a plurality of reference signature requests, wherein a first reference signature request in the plurality of reference signature requests corresponds to a first media title, a first capture date, and a first set of signatures, and a second reference signature request in the plurality of reference signature requests corresponds to a second media title, a second capture date, and a second set of signatures;
   prioritization circuitry to prioritize a plurality of reference signature requests amongst themselves, the prioritization based on at least one of: (a) a comparison between a number of completed signatures in the first set and a number of completed signatures in the second set, (b) a comparison between the first capture date and the second capture date, or (c) a comparison between an amount of the first media title to be captured and an amount of the second media title to be captured;
   synchronization circuitry to assign a reference signature request to an automated capture tool circuitry, the reference signature request being one of the plurality of reference signature requests, the assignment in response to the prioritization;
   automated capture tool circuitry to play media, the media described by the reference signature request; and
   status receiver circuitry to receive a status update regarding the reference signature request.

2. The apparatus of claim 1, wherein the synchronization circuitry is to assign the reference signature request with the highest prioritization amongst the plurality of reference signature requests to the automated capture tool circuitry.

3. The apparatus of claim 1, wherein the status update is to indicate whether a complete signature was successfully created.

4. The apparatus of claim 1, wherein the status update is to provide an indication of whether a completed signature was considered for use as a reference signature.

5. The apparatus of claim 4, wherein the prioritization circuitry is to further change the prioritization of the plurality of the reference signature requests, the change in response to the indication that the completed signature was considered for use as a reference signature.

6. The apparatus of claim 1, wherein the employee interface circuitry is to provide the status update to an employee.

7. At least one non-transitory machine-readable medium comprising instructions that, when executed, cause at least one processor to at least:
   receive a plurality of reference signature requests, wherein a first reference signature request in the plurality of reference signature requests corresponds to a first media title, a first capture date, and a first set of signatures, and a second reference signature request in the plurality of reference signature requests corresponds to a second media title, a second capture date, and a second set of signatures;
   prioritize a plurality of reference signature requests amongst themselves, the prioritization based on at least one of: (a) a comparison between a number of completed signatures in the first set and a number of completed signatures in the second set, (b) a comparison between the first capture date and the second capture date, and (c) a comparison between an amount of the first media title to be captured and an amount of the second media title to be captured;
   assign a reference signature request to an automated capture tool circuitry, the reference signature request being one of the plurality of reference signature requests, the assignment in response to the prioritization;

play media described by the reference signature request; and receive a status update regarding the reference signature request.

8. The at least one non-transitory machine-readable medium of claim 7, wherein the instructions, when executed, cause the at least one processor to assign the reference signature request with the highest prioritization amongst the plurality of reference signature requests to the automated capture tool circuitry.

9. The at least one non-transitory machine-readable medium of claim 7, wherein the status update is to indicate whether a complete signature was successfully created.

10. The at least one non-transitory machine-readable medium of claim 7, wherein the status update is to provide an indication of whether a completed signature was considered for use as a reference signature.

11. The at least one non-transitory machine-readable medium of claim 10, wherein the instructions, when executed, cause the at least one processor to change the prioritization of the plurality of the reference signature requests in response to the indication that the completed signature was considered for use as a reference signature.

12. The at least one non-transitory machine-readable medium of claim 7, wherein the instructions, when executed, cause the at least one processor to provide the status update to an employee.

13. An apparatus to automate recording of media for signature creation comprising, the apparatus comprising:

means for receiving a plurality of reference signature requests, wherein a first reference signature request in the plurality of reference signature requests corresponds to a first media title, a first capture date, and a first set of signatures, and a second reference signature request in the plurality of reference signature requests corresponds to a second media title, a second capture date, and a second set of signatures;

means for prioritizing a plurality of reference signature requests amongst themselves, the prioritization based on at least one of: (a) a comparison between a number of completed signatures in the first set and a number of completed signatures in the second set, (b) a comparison between the first capture date and the second capture date, or (c) a comparison between an amount of the first media title to be captured and an amount of the second media title to be captured;

means for assigning a reference signature request to an automated capture tool circuitry, the reference signature request being one of the plurality of reference signature requests, the assignment in response to the prioritization;

means for playing a media, the media described by the reference signature request; and means for receiving a status update regarding the reference signature request.

14. The apparatus of claim 13, wherein the means for assigning the reference signature request further includes assigning the highest prioritization amongst the plurality of reference signature requests to the automated capture tool circuitry.

15. The apparatus of claim 13, wherein the status update is to indicate whether a complete signature was successfully created.

16. The apparatus of claim 13, wherein the status update is to provide an indication whether a completed signature was considered for use as a reference signature.

17. The apparatus of claim 16, wherein the means for prioritizing a plurality of reference signature requests amongst themselves further includes means for changing the prioritization of the plurality of the reference signature requests, the change in response to the indication that the completed signature was considered for use as a reference signature.

18. The apparatus of claim 13, further including means for providing the status update to an employee.

19. A method to automate recording of media for signature creation, the method comprising:

receiving a plurality of reference signature requests, wherein a first reference signature in the plurality corresponds to a first media title, a first capture date, and a first set of signatures, and a second reference signature request in the plurality corresponds to a second media title, a second capture date, and a second set of signatures;

prioritizing a plurality of reference signature requests amongst themselves, the prioritization based on at least one of (a) a comparison between a number of completed signatures in the first set and a number of completed signatures in the second set, and (b) a comparison between an amount of the first media title to be captured and an amount of the second media title to be captured;

assigning a reference signature request to an automated capture tool circuitry, the reference signature request being one of the plurality of reference signature requests, the assignment in response to the prioritization;

playing a media, the media described by the reference signature request; and receiving a status update regarding the reference signature request.

20. The method of claim 19, wherein assigning the reference signature further includes assigning the highest prioritization request amongst the plurality of reference signature requests to the automated capture tool circuitry.

21. The method of claim 19, wherein the status update is to indicate whether a complete signature was successfully created.

22. The method of claim 19, wherein the status update is to provide an indication of whether a completed signature was considered for use as a reference signature.

23. The method of claim 22, wherein prioritizing a plurality of reference signature requests amongst themselves further includes changing the prioritization of the plurality of the reference signature requests, the changing in response to the indication if a completed signature was considered for use as a reference signature.

24. The method of claim 19, wherein the method further includes providing the status update to an employee.

* * * * *